United States Patent Office 2,710,483
Patented June 14, 1955

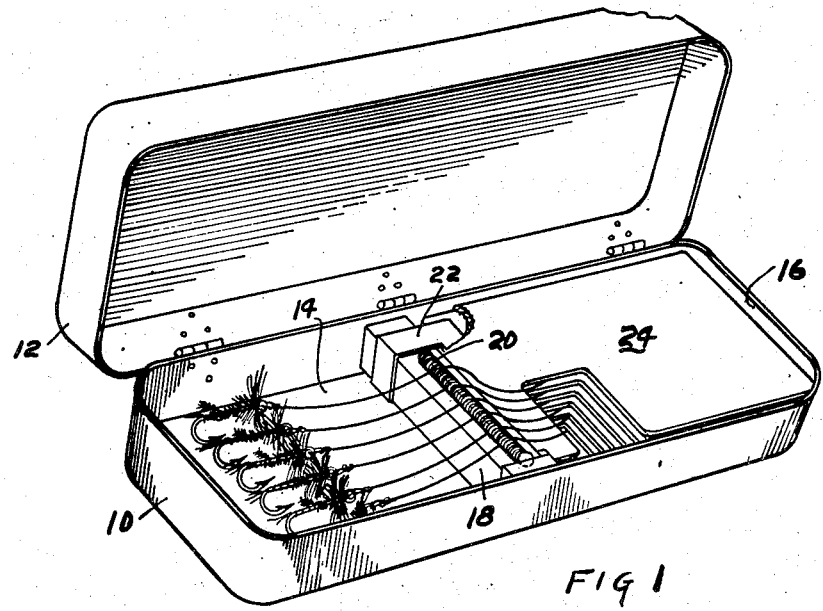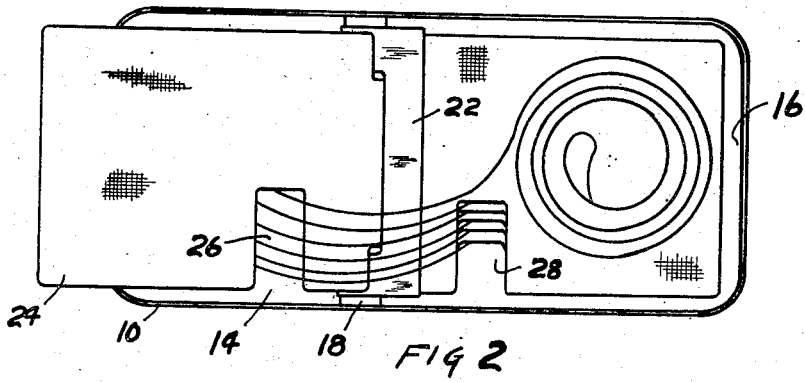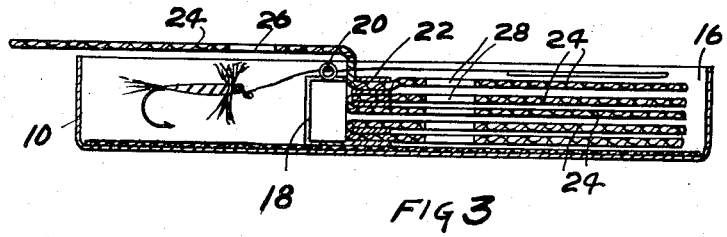

2,710,483

FLY BOX

Harry B. Lindsay, Worcester, Mass.

Application October 8, 1952, Serial No. 313,665

3 Claims. (Cl. 43—57.5)

This invention relates to new and improved fly boxes, and the principal object of the invention resides in the provision of a box for containing a number of flies for fishing, said flies preferably being dry flies, i. e. those which are intended to float, although the invention may be practiced to advantage even though the flies used may be wet or sinking flies; the provision of a fly box having special provision made for containing the flies above noted in combination with means for separately holding long leaders of nylon or gut, which leaders, together with the flies, are adapted to be completely interchanged with other leaders at the end of the fly line, so that not merely the fly itself is changed, but the entire leader, and connected fly, is changed to the end that flies may be changed much more quickly and easily, leader tippets are not needed, and the leader is not shortened due to changing of flies with consequent cutting off of leader material or of the tippet, the latter being a short length of fine leader material used to avoid shortening the leader.

Another object of the invention resides in the provision of a fly box as above described obviating the need of changing flies on a leader and also obviating the use of snells which provide connection means that are often disturbing to the fish and result in failure of the fish to strike at the fly.

Another object of the invention resides in the provision of a container which may be in the nature of a fly box having two compartments therein, in one of which the flies with leaders connected are adapted to be stored in such a way as to prevent crushing; and in the other compartment there are arranged a plurality of leaves, preferably made of some absorbent material and adapted to be superimposed as in a stack but being capable of being opened in the manner of leaves of a book, the leader for each fly being easily wound and stored between adjacent pairs of these absorbent leaves, so that a fly box is thus provided which stores the flies in an orderly manner, and from which the flies are easily extracted and returned, wherein the flies are connected to long leaders as distinct from the usual case where the flies per se are merely arranged in the fly box without leaders.

Reference is to be had to the accompanying drawings, in which:

Fig. 1 is a perspective view of a fly box according to the present invention;

Fig. 2 is a top plan view of the lower half thereof showing one of the leaves open; and Fig. 3 is a vertical section through the lower part of the fly box as shown in Fig. 2, with some of the leaders omitted for clarity of illustration.

In carrying out the invention, there is provided a box, generally indicated at 10, having a cover of any description, as at 12. The box has a bottom and an upstanding side flange or rim forming a container, which may be opened as shown in Fig. 1.

This container is divided into two compartments. It is preferred that one of these compartments indicated at 14 be free and unincumbered for housing flies as shown in Fig. 1; and the other compartment indicated at 16 will preferably be larger and contains a series of leaves or panels to be described.

In order to provide the two compartments, there is a partition of any convenient description generally indicated at 18 and this extends from side to side of the box. On this partition, there is preferably provided a coil spring 20 as well as a strap, hinge, or other means 22 for clamping or otherwise holding the leaves or panels 24 against the bottom of the box. Six are shown, although there may be any quantity desired. These leaves are preferably made of some absorbent material such as flannel, felt or the like, and each is folded upon itself providing doubled leaves or folds, and each doubled leaf or fold is provided with a slot arranged parallel to and adjacent the strap 22, these slots decreasing in length toward the bottom of the fly box as respects the succeeding leaves or folds.

The longest slot is in the top leaf and is indicated at 26, and the reference numeral 28 indicates the remaining slots which as shown in Fig. 2 decrease in length from the top of the stack to the bottom thereof.

In the use of this box, the flies are arranged in order as shown in Fig. 1, and the attached long leader for each fly may be thrust downwardly between coils of the spring, thus holding the leader in its relative position along the spring. The leader is then coiled as indicated in Fig. 2, and is disposed between a pair of leaves 24. If the leader is wet, it will be rapidly dried.

It is to be particularly noted that all of the flies have means provided, i. e. the coil spring, for maintaining the portion of the leader adjacent the fly in mutually spaced relation, so that the leaders will not tangle. Furthermore, each leader is then coiled and positioned between its own pair of leaves and the slots are arranged as clearly shown, so that the fly that is nearest the back of the box, i. e. near the hinge side, has a leader which is positioned in the top slot 26, so that it is apparent at once the pair of leaves between which an individual leader may be found. It is therefore seen that the leaders cannot become tangled and may be taken out and replaced with a minimum of effort or thought, and each fly is immediately available for securement to a fly line as above described.

In addition, the flies may be held free of contact with any part of the fly box or other container, as shown in Fig. 3. Since the leaders being gut or nylon are comparatively stiff although flexible enough to be coiled, they may be held by the spring 20 adjacent the individual flies, which are then held as shown in Fig. 3, and cannot be crushed or distorted by contact with the other flies or parts of the box.

Having thus described my invention and the advantages thereof, I do not wish to be limited to the details herein disclosed, otherwise than as set forth in the claims, but what I claim is:

1. A box for fishing flies comprising a receptacle and a cover hinged to the receptacle, said receptacle having a pair of compartments, a partition between said compartments, means for holding leaders in spaced relation on said partition, and a column of panels in one compartment, each panel comprising a pair of leaves connected by a fold, said folds being adjacent the holding means, each leaf having a notch therein, the notches being in alignment, the partition having a portion thereof overlapping one of the folds to maintain the panels within the receptacle, each panel being adapted to receive the major portion of a leader of substantial length in coiled condition, a portion of the leader being adapted to be held by the holding means and a fly connected to the latter portion being adapted to be retained in the other compartment whereby unfolding of a leaf of a panel exposes a leader and facilitates removal of said leader and its associated fly from said receptacle.

2. The box recited in claim 1 wherein the notches are of progressively different sizes.

3. A box for fishing flies comprising a container, means providing a pair of compartments therein, a series of foldable leaves secured to the box centrally of the box and disposed in one of the compartments when folded and capable of being unfolded in order to reveal folds thereunder, and means for accommodating leaders and holding the same in spaced relation transversely of the box, there being a series of flies in the other compartment, each fly being provided with a long leader adapted to be separately held in said means and each leader being separately coiled and disposed between a different pair of folds in the other compartment, each of the leaves having a slot for the reception of individual leaders so that the same may pass through superimposed folds for disposition of individual leaders between adjacent folds of the leaves, said slots being aligned and decreasing in size from the topmost leaf downwardly.

References Cited in the file of this patent

UNITED STATES PATENTS

| | | |
|---|---|---|
| Re. 10,598 | Price | May 19, 1885 |
| 333,384 | Bray | Dec. 29, 1885 |
| 444,272 | Benn | Jan. 6, 1891 |
| 566,903 | Gieschen | Sept. 1, 1896 |
| 726,509 | Connor | Apr. 28, 1903 |
| 869,614 | Bennett | Oct. 29, 1907 |
| 952,314 | Ellsworth | Mar. 15, 1910 |
| 2,220,817 | Holmes | Nov. 5, 1940 |

FOREIGN PATENTS

| | | |
|---|---|---|
| 3,025 | Great Britain | 1909 |